(12) United States Patent
Cheng et al.

(10) Patent No.: US 8,630,814 B2
(45) Date of Patent: Jan. 14, 2014

(54) ULTRASONIC WATER LEVEL GAUGE AND CONTROL DEVICE

(75) Inventors: Andrew A. Cheng, Wilmette, IL (US); James J. Gu, Buffalo Grove, IL (US); John E. Branzell, Skokie, IL (US)

(73) Assignee: Xylem IP Holdings LLC., White Plaines, NY (US)

( * ) Notice: Subject to any disclaimer, the term of this patent is extended or adjusted under 35 U.S.C. 154(b) by 337 days.

(21) Appl. No.: 13/017,871

(22) Filed: Jan. 31, 2011

(65) Prior Publication Data

US 2012/0197555 A1   Aug. 2, 2012

(51) Int. Cl.
*G01F 23/296* (2006.01)

(52) U.S. Cl.
USPC .......................................................... 702/55

(58) Field of Classification Search
USPC .......................................................... 702/55
See application file for complete search history.

(56) References Cited

U.S. PATENT DOCUMENTS

| | | |
|---|---|---|
| 4,048,856 A | 9/1977 | Conrad |
| 4,195,517 A | 4/1980 | Kalinoski et al. |
| 4,383,544 A | 5/1983 | Vosper |
| 4,454,767 A | 6/1984 | Shinkai et al. |
| 4,470,299 A | 9/1984 | Soltz |
| 4,582,025 A | 4/1986 | Grasso |
| 4,984,449 A | 1/1991 | Caldwell et al. |
| 5,006,407 A | 4/1991 | Malhotra |
| 5,119,676 A | 6/1992 | Bower et al. |
| 5,179,862 A | 1/1993 | Lynnworth |
| 5,224,445 A | 7/1993 | Gilbert, Sr. |
| 5,319,972 A | 6/1994 | Oblak et al. |
| 5,319,973 A | 6/1994 | Crayton et al. |
| 5,351,036 A | 9/1994 | Brown et al. |
| 5,438,868 A | 8/1995 | Holden et al. |
| 5,456,108 A | 10/1995 | Birkett |
| 5,793,705 A * | 8/1998 | Gazis et al. ............... 367/98 |
| 5,900,546 A | 5/1999 | Wilkins |
| 5,996,407 A | 12/1999 | Hewitt |
| 6,490,933 B2 | 12/2002 | Pan et al. |
| 6,513,377 B1 | 2/2003 | Sassi et al. |

(Continued)

FOREIGN PATENT DOCUMENTS

| | | |
|---|---|---|
| EP | 0028114 | 5/1981 |
| EP | 1293960 | 3/2003 |
| EP | 1524505 | 4/2005 |
| WO | 2006004760 | 1/2006 |

OTHER PUBLICATIONS

IC sensor, Sensors for Liquid Level Monitoring Include Float, Optical and Ultrasonic, Mar. 1, 2013, 3 pages.*
English language abstract of EP1293960 (1 page).

(Continued)

*Primary Examiner* — Tung S Lau

(57) ABSTRACT

Apparatus, including an ultrasonic liquid level gauge and control system, includes a gauge configured to be coupled on the outside of a device, having a boiler or hot water tank, having liquid contained therein. The gauge is also configured to receive and contain a small part of the liquid of the device; and an ultrasonic transducing and signal processing arrangement configured to: reflect an ultrasonic pulse off a liquid surface of the small part of the liquid of the device contained in the gauge, and determine the level of liquid in the device based at least partly on a time of flight analysis related to the ultrasonic pulse reflected off the liquid surface of the small part of the liquid of the device contained in the gauge.

15 Claims, 13 Drawing Sheets

Ultrasonic water level gauge and control system for a boiler

(56) References Cited

U.S. PATENT DOCUMENTS

| | | |
|---|---|---|
| 6,588,272 B2 | 7/2003 | Mulrooney et al. |
| 6,615,657 B2 | 9/2003 | Hongerholt et al. |
| 6,644,130 B2 | 11/2003 | Imai et al. |
| 6,666,086 B2 | 12/2003 | Colman et al. |
| 6,889,552 B2 | 5/2005 | Nguyen et al. |
| 6,964,278 B2 | 11/2005 | Tschanz |
| 7,114,390 B2 | 10/2006 | Lizon et al. |
| 7,150,190 B2 | 12/2006 | Krufka et al. |
| 7,168,314 B2 | 1/2007 | Voss |
| 7,217,343 B2 | 5/2007 | Land |
| 7,788,973 B2 | 9/2010 | Quill |
| 2007/0209440 A1 | 9/2007 | Dockendorff et al. |
| 2009/0159018 A1 | 6/2009 | Mehendale et al. |
| 2009/0303059 A1 | 12/2009 | Von Lintzgy et al. |
| 2010/0126433 A1 | 5/2010 | Kozaki |
| 2010/0180679 A1 | 7/2010 | Luo |

OTHER PUBLICATIONS

English language abstract of EP0028114 (1 page).

\* cited by examiner

Apparatus 10, including an ultrasonic liquid level gauge and control system

A gauge 12 configured to be coupled on the outside of a device, including a boiler or hot water tank, having liquid contained therein, and the gauge also configured to receive and contain a small part of the liquid of the device; and An ultrasonic transducer and signal processing arrangement 14 configured to:

Reflect an ultrasonic pulse off a liquid surface of the small part of the liquid of the device contained in the gauge, and Determine the level of liquid in the device based at least partly on a time of flight analysis related to the ultrasonic pulse reflected off the liquid surface of the small part of the liquid of the device contained in the gauge Other modules 16 for implementing other functionality associated with the apparatus

*FIG. 1a*

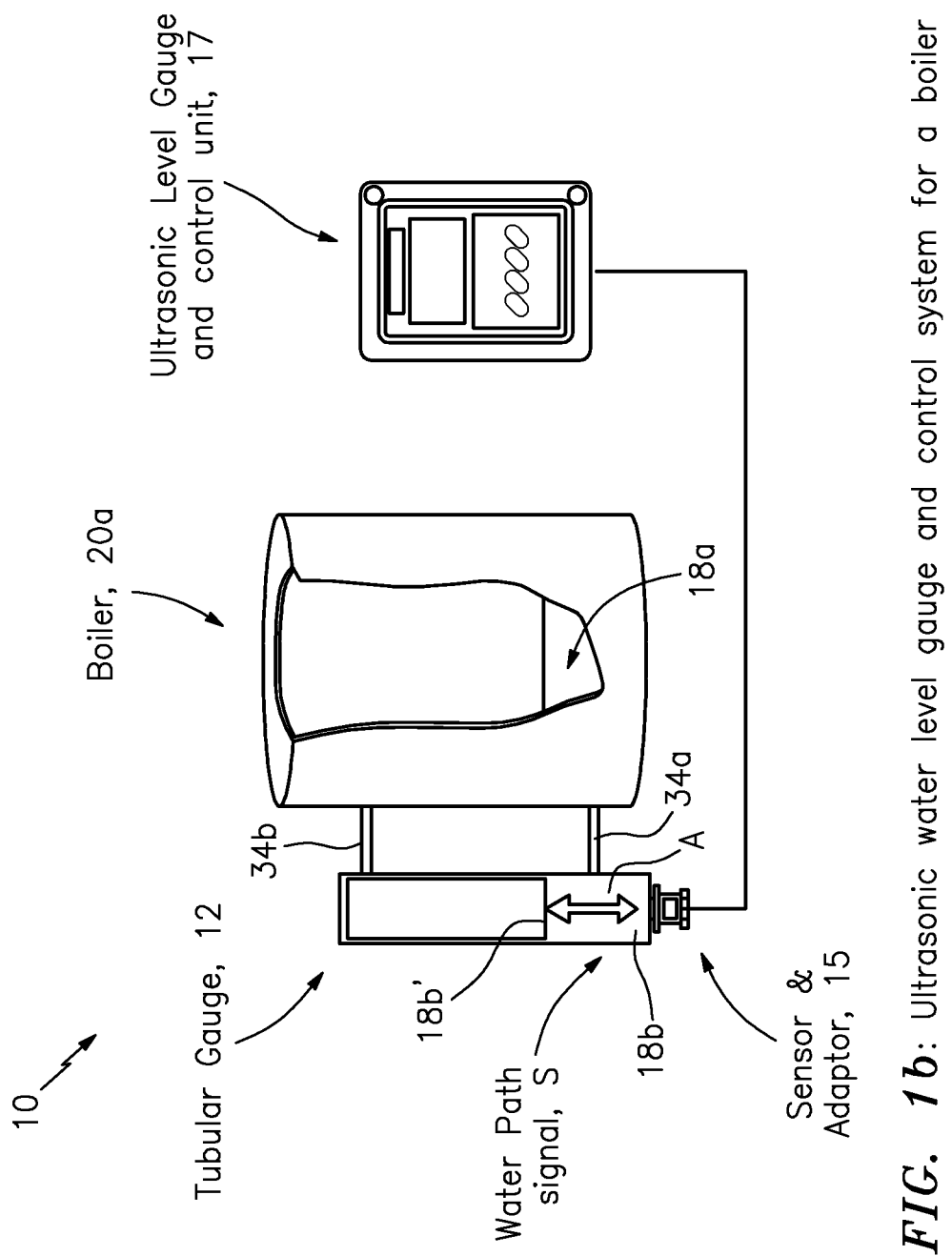
FIG. 1b: Ultrasonic water level gauge and control system for a boiler

A method

> reflecting an ultrasonic pulse off a liquid surface of a small part of liquid of a device, including a boiler or hot water tank, contained in a gauge configured on the outside of the device, the device configured to contain most of the liquid, and the gauge configured to receive and contain the small part of the liquid of the device; and > determining the level of liquid in the device based at least partly on a time of flight analysis related to the ultrasonic pulse reflected off the liquid surface of the small part of the liquid of the device contained in the gauge > Other steps for implementing other functionality associated with the method

*FIG. 1c*

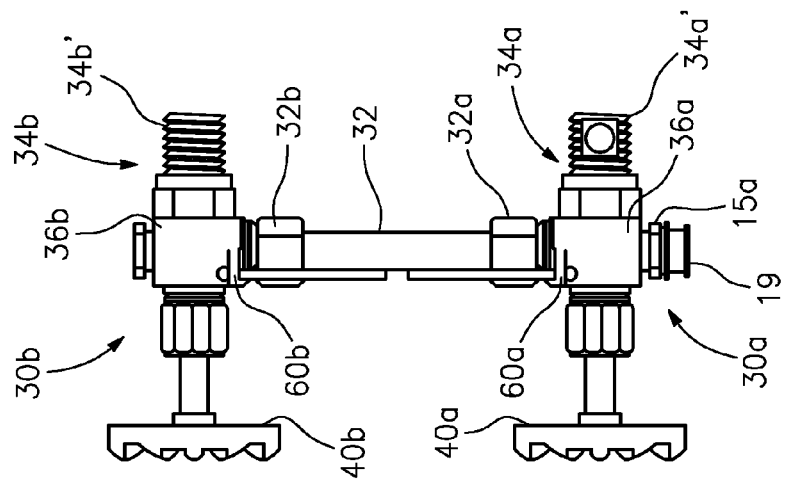
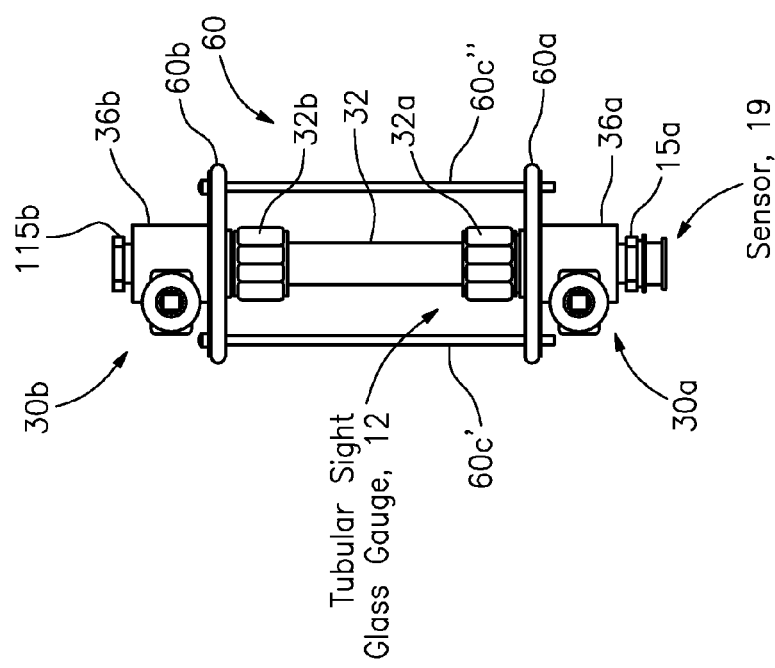
FIG. 2: Preferred ultrasonic sensor measurement set up

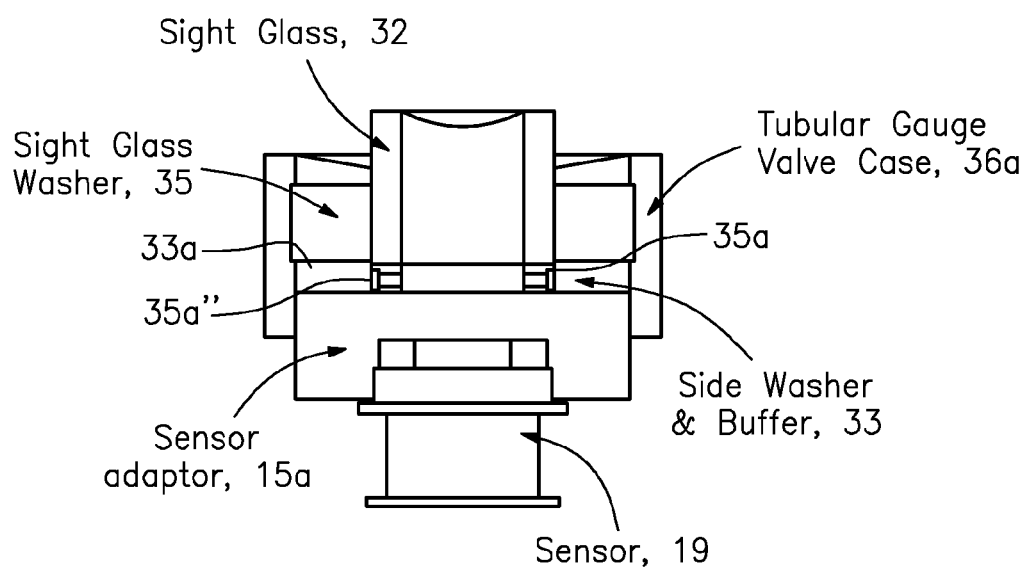
FIG. 3: Detailed design for ultrasonic sensor and adaptor

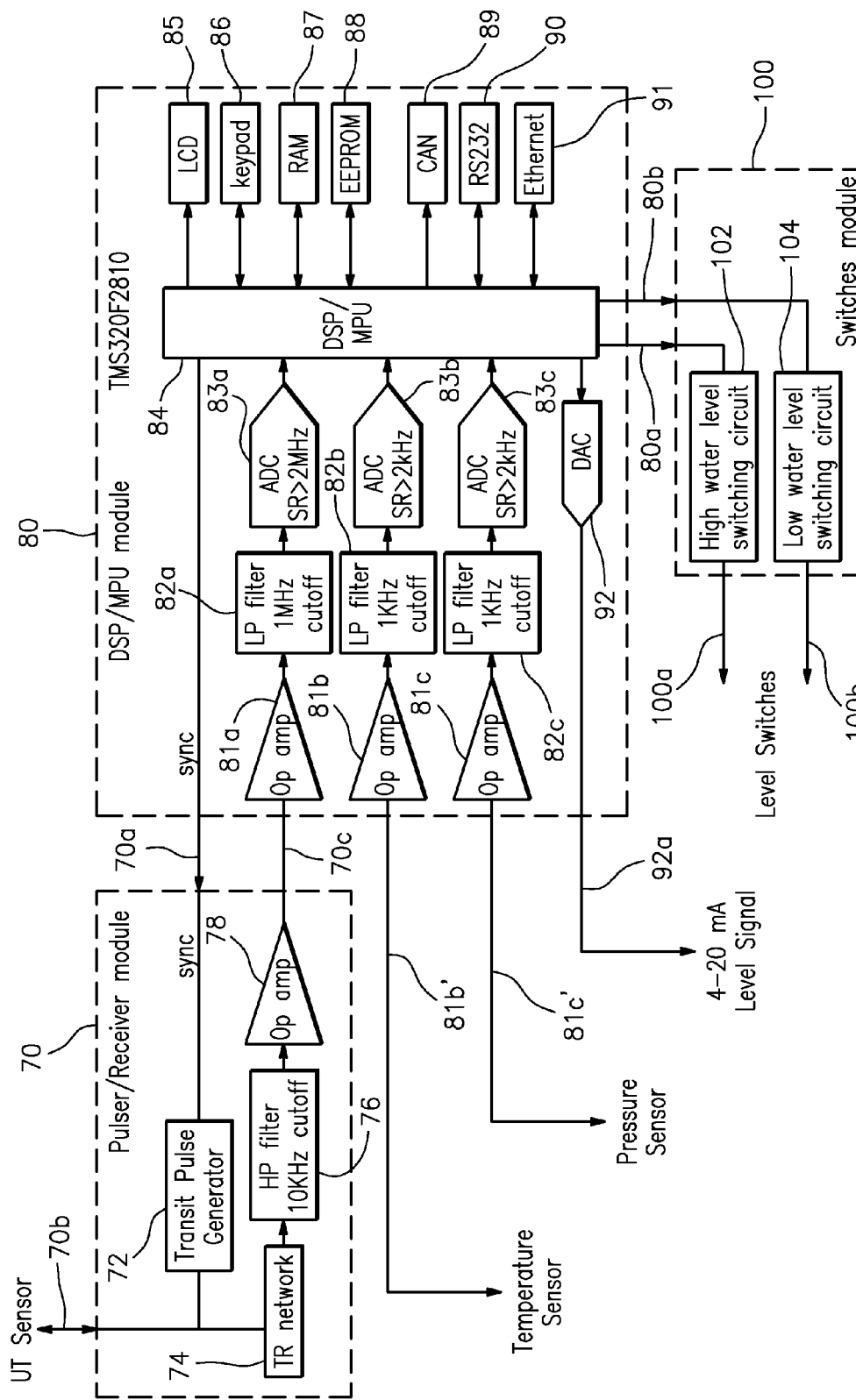
FIG. 4a: System hardware layout for ultrasonic water level gauge and control

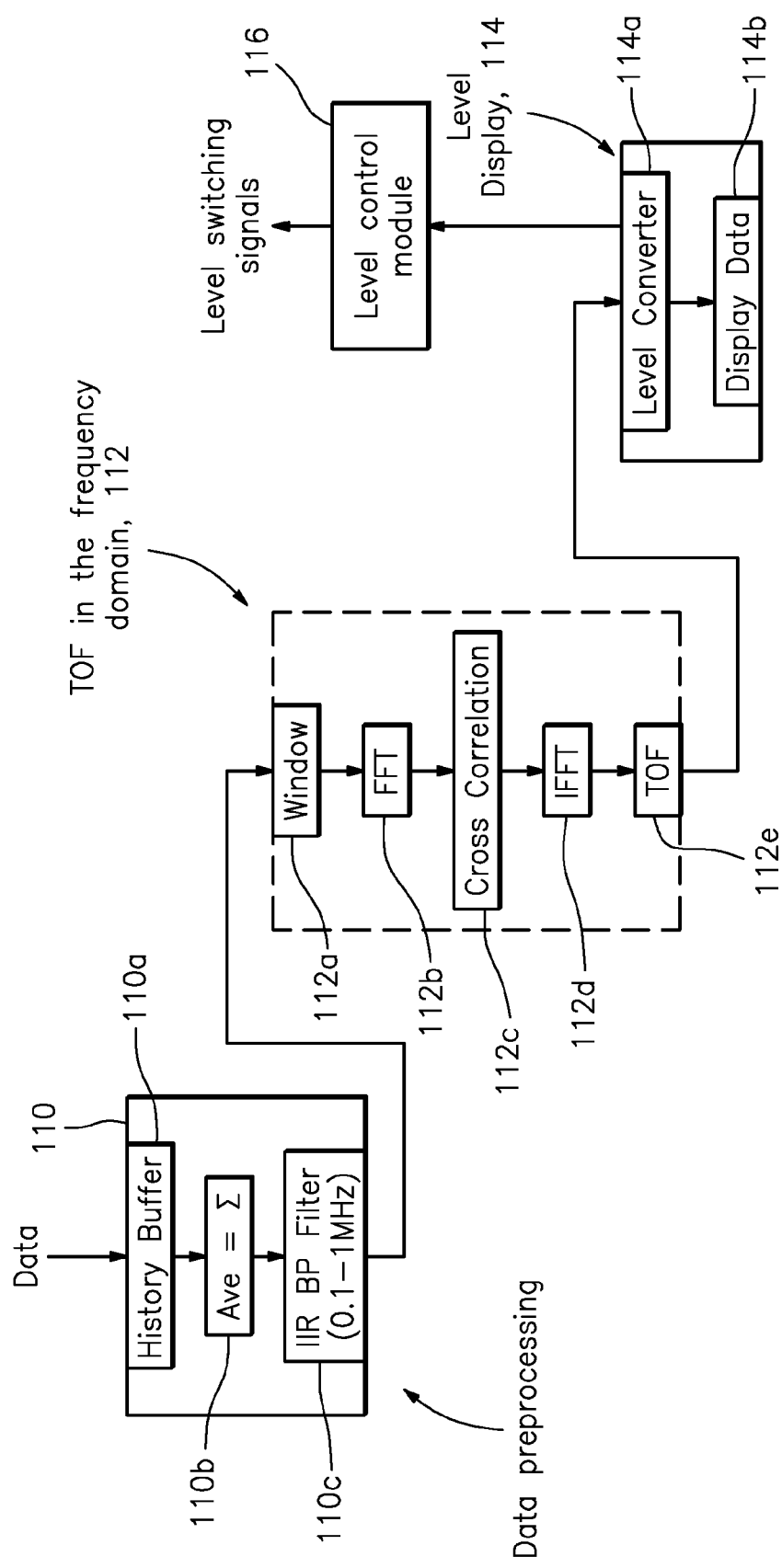
FIG. 5: System Application Software Modules Layout for Ultrasonic Water Level Gauge and Control

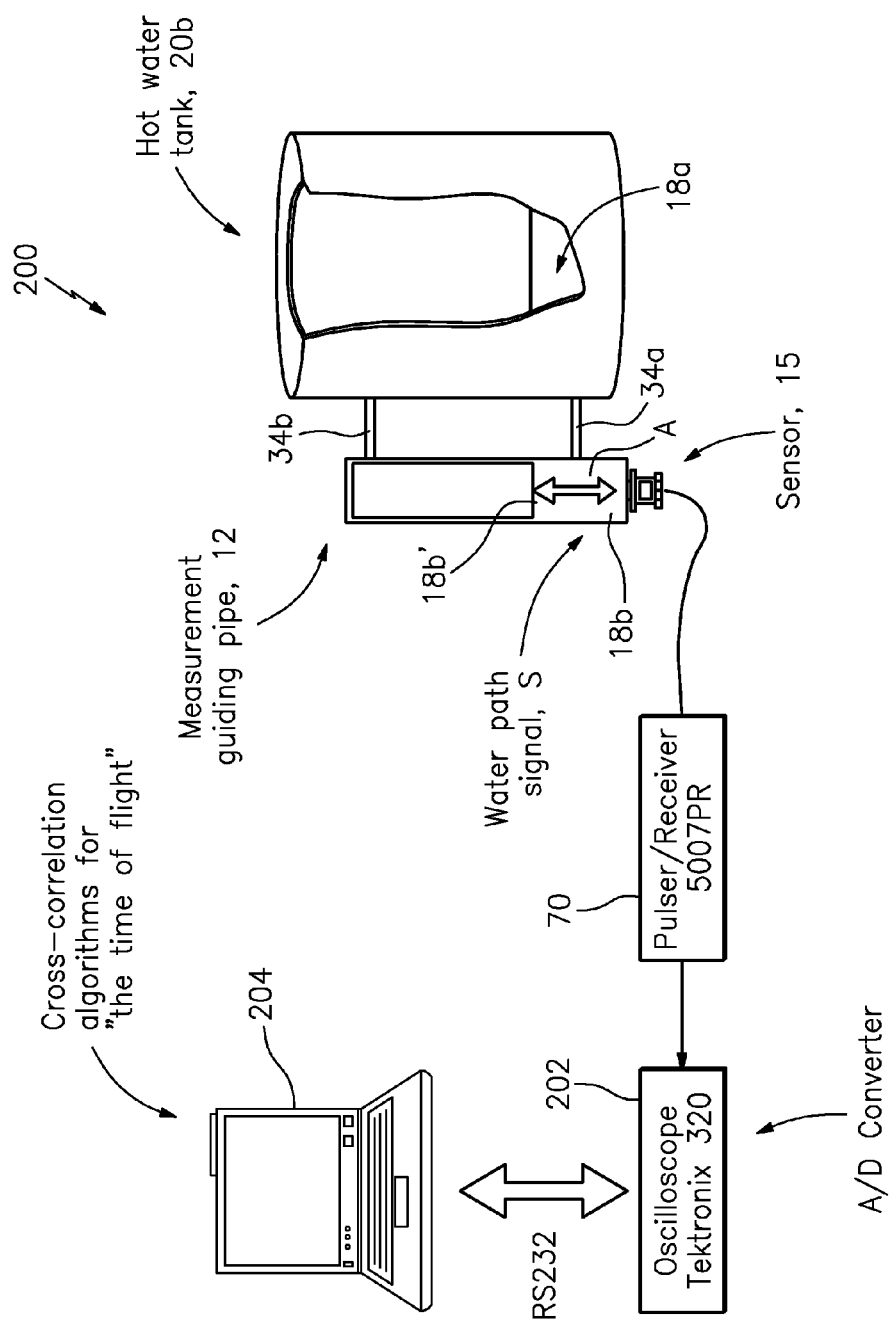
FIG. 6: Ultrasonic water level measurement for hot water heater

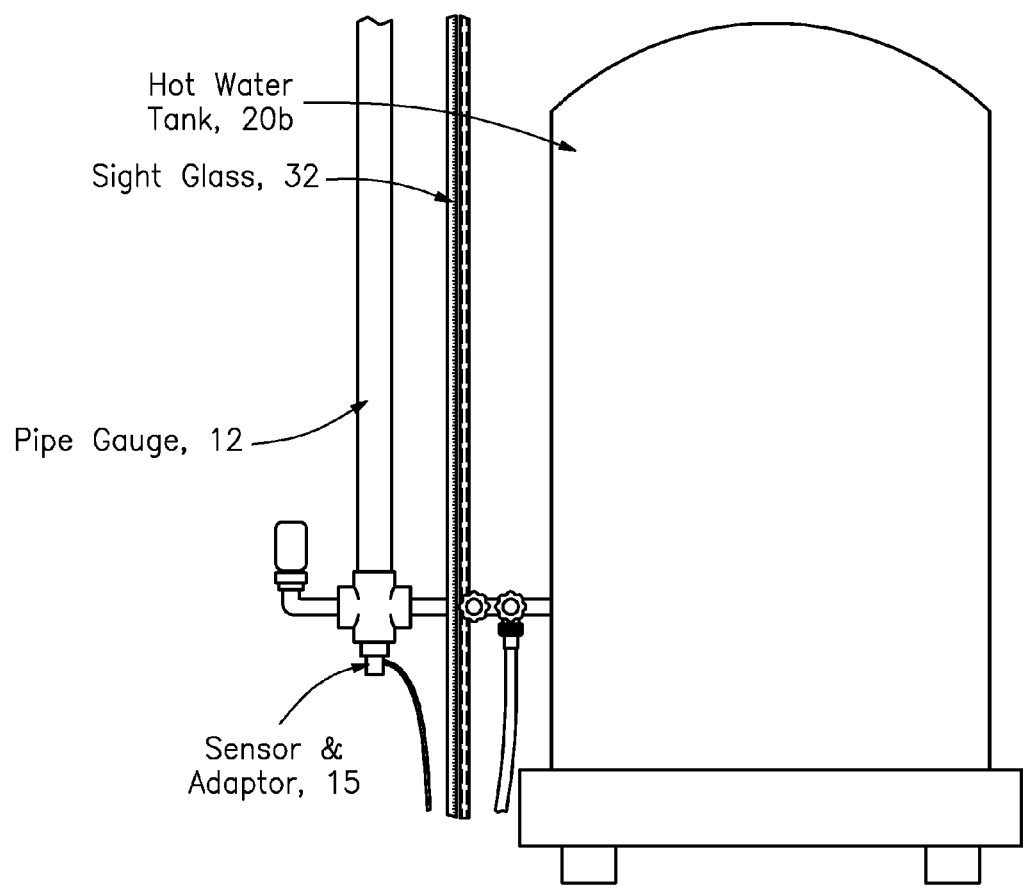
FIG. 7a: Picture of the feasibility test at a hot water test

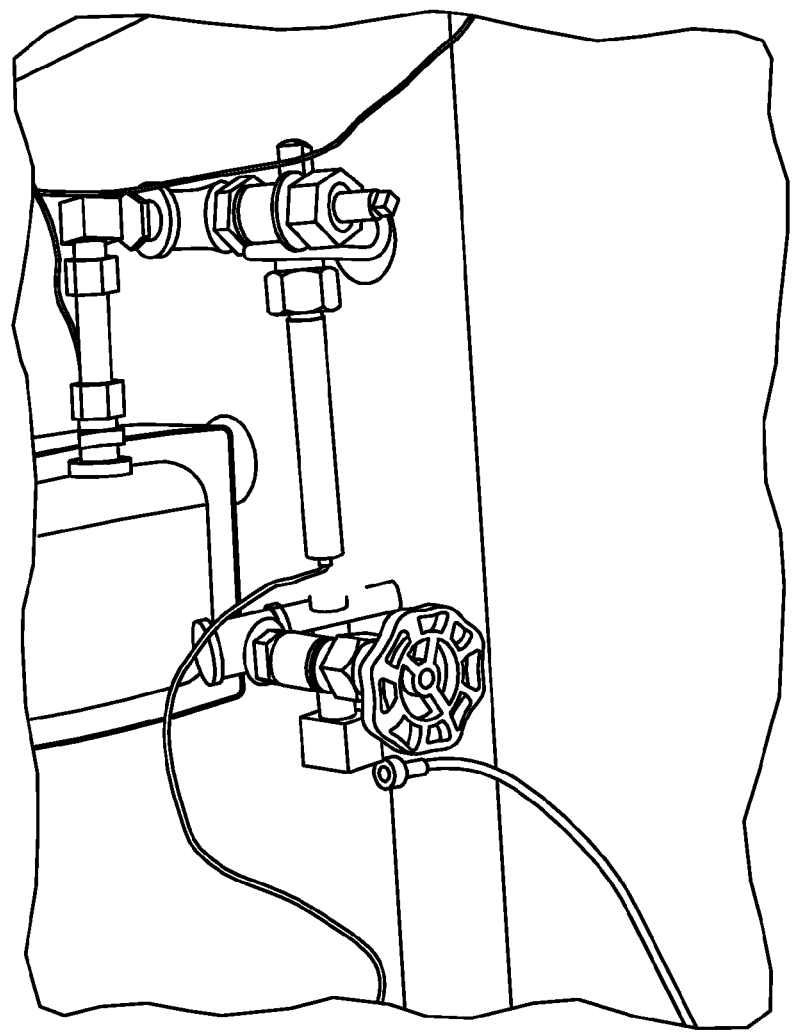
FIG. 7b: Picture of the feasibility test at a boiler

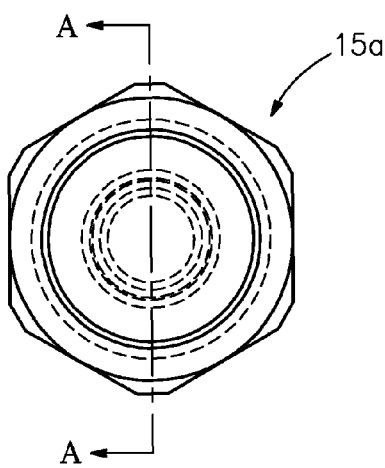
FIG. 8(1)b
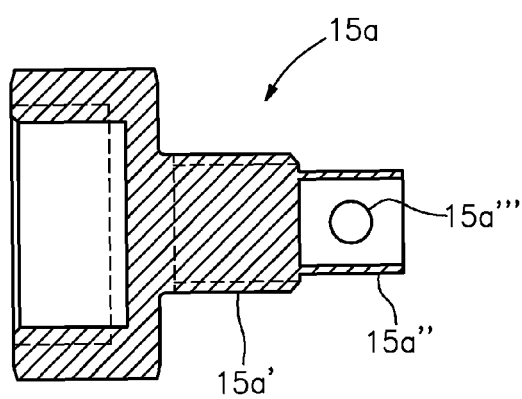
FIG. 8(1)c
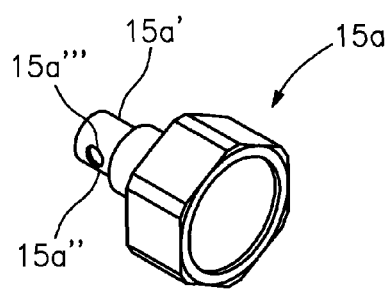
FIG. 8(1)a
FIG. 8(1)

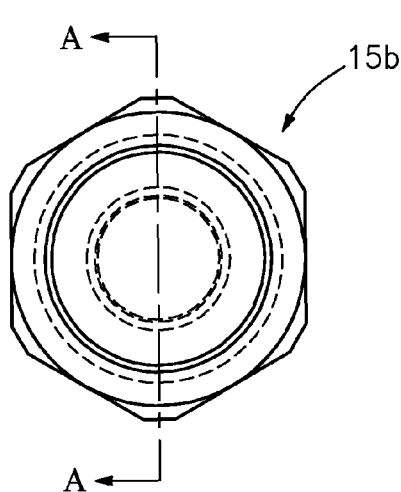
FIG. 8(2)b
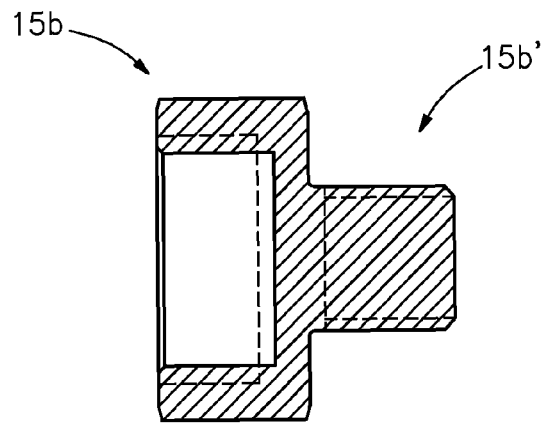
FIG. 8(2)c
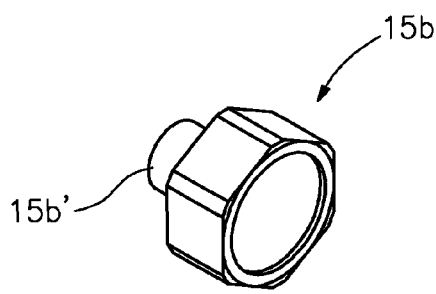
FIG. 8(2)a
FIG. 8(2)

ULTRASONIC WATER LEVEL GAUGE AND CONTROL DEVICE

BACKGROUND OF THE INVENTION

1. Field of the Invention

The present invention relates to a method and apparatus for measuring the water level in a boiler; and more particularly, the present invention relates to a method and apparatus for measuring the water level in a boiler using an ultrasonic level gauge and control device.

2. Brief Description of Related Art

In current techniques for water level gauge and control for a boiler or a hot water tank, a tubular sight glass mounted on the outside of the boiler and a water level switch at each end of the boiler control water levels are the most commonly used means for most residential, commercial or industrial applications. Due to the harsh working conditions of high temperature, high pressure, high humidity and condensate, and turbulent water surface while boiling, most techniques including some ultrasonic level measurements for a liquid tank through either an air path approach or a water path approach might be unfeasible and impractical for this specific application.

Different from most conventional applications for ultrasonic liquid level measurements at a liquid tank, the worst scenarios for a boiler application case are steamy condensate and turbulent water surfaces while boiling, as well as high pressure and temperature. The sound path that goes through the air from the top to the water surface in a boiler by using an air-coupled transducer will be ruined soon after the steam and condensate build up in the path when the water is boiling. On the other hand, instead of being reflected back to the transducer for the water path approach, almost all sound energy will be scatted away by the chaotic boiling water surface. The reason for that is mainly due to the wavelength or the center frequency of the sound which is used here. The shorter the wavelength, the more scattered the waves are by an uneven surface and the less the wave energy is reflected back. Different from an air-path approach with the transducer center frequencies ranging from 22 to 150 kHz, in the water path approach, a slightly higher frequency ranging from 0.5 to 2.25 MHz has to be used in order for sounds to penetrate through the wall thickness of the boiler and propagate in the water. Hence, based on this understanding in the prior art, there is no assurance at all for the ultrasonic water level measurements to be successful in a boiler.

In view of this, there is a need in the industry to solve the aforementioned problem in the art.

SUMMARY OF THE INVENTION

In summary, to solve the problems mentioned above, the present invention provides a new ultrasonic water level measurement technique arranged in relation to the outside of a device, such as a boiler or hot water heater, by making use of its current water level gauge or sight glass gauge setup. According to some embodiments, by means of a valve in the gauge plus a specially designed side washer buffer, the water surface in the gauge is more toned down than that in the boiler, which in return makes the ultrasonic level measurement much more feasible in the gauge. Furthermore, due to the fact that the water level in the gauge is about an average water level in the boiler for a close loop hydraulic system, the water level measurement accuracy and the water level control can, therefore, be gauged to some extent.

According to some embodiments, a ultrasonic water level gauge and control system, e.g., for such a boiler or a hot water tank, may be configured to include an ultrasonic transducer, a specifically designed transducer adaptor to a tubular gauge which is hooked up on the outside of the boiler, and an ultrasonic water level measurement and control unit. Through the transducer adaptor connected directly to the gauge, an ultrasonic signal generated by the transducer is transmitted in the tube of the gauge through the water path from the bottom up then reflected by the water surface back to the transducer. The flight time of the ultrasonic signal which corresponds to the water level in the gauge can thus be evaluated to determine the level of liquid in the device based at least partly the ultrasonic pulse reflected off the liquid surface of the part of the liquid of the device contained in the gauge.

According to some embodiments, the ultrasonic water level gauge and control system may be configured to make the ultrasonic water level measurement and control in devices, e.g., like the boiler or the hot water tank, feasible and practical. When compared to the currently known level gauge and control techniques for a known boiler, i.e., the sight glass and the level switches, the present invention combines two important aspects of the water level measurement and the level control, in that it is an automatic and non-invasive approach without any significant requirements for the modification on the boiler itself, and it has a high and satisfactory measurement and control accuracy.

According to some embodiments, the present invention may take the form of an ultrasonic water level measurement setup that is based at least partly on using a tubular sight glass gauge with an off-set valve design and comprises, e.g., an ultrasonic transducer, a sensor adaptor and a side washer buffer.

According to some embodiments, the system hardware of the ultrasonic water level measurement and control unit related to this invention may include a hardware unit comprising a pulser/receiver module for ultrasound signal generation and receiving, a level switch module for water level control at the boiler, and a digital signal processor and microprocessor control unit (DSP/MCU) module configured for the data acquisition, processing and display, and for communicating with a water level control module. Besides the ultrasonic signal, temperature and pressure in the water may also be monitored by means of a temperature sensor and a pressure sensor. These signals may be acquired and processed through the DSP/MCU module, and may also be used for a sound speed compensation.

According to some embodiments, the present invention may take the form of a method based at least partly on a system software flowchart for the ultrasonic water level measurement and control unit may be used for implementing the function related to this invention, where the time of flight of the ultrasonic signal may be determined or calculated through a cross-correlation algorithm in, e.g., the frequency domain.

Consistent with that disclosed herein, the present invention to implement the new ultrasonic water level measurement technique may take the form of many different embodiments, including one or more method or apparatus, for solving the aforementioned problem in the art consistent with that set forth below:

Apparatus, e.g. an Ultrasonic Liquid Level Gauge and Control System

According to some embodiments, the present invention may take the form of apparatus, including an ultrasonic liquid level gauge and control system, comprising a gauge and an ultrasonic transducing and signal processing arrangement. The gauge may be configured to be coupled on the outside of a device, including a boiler or hot water tank, having liquid, e.g., water, contained therein, and the gauge may also be configured to receive and contain a small part of the liquid of the device. The ultrasonic transducing and signal processing arrangement may be configured to: reflect an ultrasonic pulse off a liquid surface of the small part of the liquid of the device contained in the gauge, and determine the level of liquid in the device based at least partly the ultrasonic pulse reflected off the liquid surface of the small part of the liquid of the device contained in the gauge, including using a technique based at least partly on a time of flight analysis related to the ultrasonic pulse reflected off the liquid surface of the small part of the liquid of the device contained in the gauge.

According to some embodiments, the apparatus, including the ultrasonic liquid level gauge and control system, may also include one or more of the following features: The gauge may be configured with a valve arrangement having a sight glass configured to receive and contain the small part of the liquid of the device so that the liquid surface of the small part of the liquid of the device contained in the sight glass is substantially less turbulent than the liquid in the device. The valve arrangement may be configured with a buffer arrangement for containing a buffer portion of the small part of the liquid of the device contained in the sight glass. The gauge may be configured with upper and lower ports or adapters that are coupled at two different levels to the device to receive the small part of the liquid of the device contained in the gauge. The ultrasonic transducing and signal processing arrangement may comprise a digital signal processor (DSP) or microprocessor control unit (MCU) configured to determine the level of the liquid in the device based at least partly on the flight time of the ultrasonic pulse reflected, and the fact that the liquid level of the device contained in the gauge is about an average liquid level in the device for a close loop hydraulic system. The ultrasonic transducing and signal processing arrangement may comprises an ultrasonic sensor and adaptor configured in relation to the gauge to: receive an excitation pulse, convert the excitation pulse to the ultrasonic pulse, and provide the ultrasonic pulse through the small part of the liquid of the device contained in the gauge; and/or receive a reflected ultrasonic pulse back from the liquid surface of the small part of the liquid of the device in the gauge, convert the reflected ultrasonic pulse back into a sensor signal containing information about the liquid surface of the small part of the liquid of the device contained in the gauge, and provide the sensor signal.

According to some embodiments, the apparatus, including the ultrasonic liquid level gauge and control system, may also include one or more of the following features: The ultrasonic transducing and signal processing arrangement may comprise a pulser/receive module configured to: receive a sync signal and provide the excitation pulse; and/or receive the sensor signal containing information about the liquid surface of the small part of the liquid of the device contained in the gauge, and provide a filtered and amplified sensor signal containing information about the liquid surface of the small part of the liquid of the device contained in the gauge. The ultrasonic transducing and signal processing arrangement may comprise a DSP/MCU module having at least one processor and at least one memory including computer program code, the at least one memory and computer program code may be configured, with the at least one processor, to cause the DSP/MCU module at least to: receive the filtered and amplified sensor signal, convert the filtered and amplified sensor signal, and provide at least one signal processing and control signal containing information about the liquid surface of the small part of the liquid of the device contained in the gauge. The at least one memory and computer program code may also be configured, with the at least one processor, to cause the DSP/MCU module at least to: provide the sync signal; and/or receive the digital filtered and amplified sensor signal containing information about the liquid surface of the small part of the liquid of the device contained in the gauge, and determine the liquid level of water in the device based at least partly on the digital filtered and amplified sensor signal received. The at least one memory and computer program code may also be configured, with the at least one processor, to cause the DSP/MCU module at least to perform a flight time analysis in the frequency domain, including using at least one of a Fast Fourier Transform, a cross-correlation and an inverse discrete Fourier Transform in order to determine the time of flight. The at least one memory and computer program code may also be configured, with the at least one processor, to cause the DSP/MCU module at least to provide at least one control signal containing information about a high or low level switching condition based at least partly on the determination related to the liquid level of water in the device. The ultrasonic transducing and signal processing arrangement may also comprise a level switch module configured to: respond to the at least one control signal and provide at least one level switch control signal containing information about a high or low water level switching control of the device based on the at least one control signal received. The ultrasonic transducing and signal processing arrangement may also comprise a level switch module configured to control the device based at least partly on the determination related to the level of liquid in the device.

Apparatus, e.g. a Signal Processor or Control Unit Module

According to some embodiments, the apparatus may also take the form of a signal processor or control unit module that forms part of an ultrasonic transducing and signal processing arrangement that is configured to be coupled to a gauge coupled on the outside of a device, including a boiler or hot water tank, containing liquid therein, where the gauge is configured to contain a small part of the liquid of the device. The signal processor or control unit module may comprise at least one processor and at least one memory including computer program code, the at least one memory and computer program code configured, with the at least one processor, to cause the apparatus at least to: reflect an ultrasonic pulse off a liquid surface of the small part of the liquid of the device contained in the gauge, and determine the level of liquid in the device based at least partly on the ultrasonic pulse reflected off the liquid surface of the small part of the liquid of the device contained in the gauge, including based at least partly on a time of flight analysis related to the ultrasonic pulse reflected off the liquid surface of the small part of the liquid of the device contained in the gauge.

The signal processor or control unit module may also be configured to include one or more of the features set forth above.

The Method

According to some embodiments, the present invention may take the form of a method comprising steps for: reflecting an ultrasonic pulse off a liquid surface of a small part of liquid of a device, including a boiler or hot water tank, contained in a gauge configured on the outside of the device, the device configured to contain most of the liquid, and the gauge configured to receive and contain the small part of the liquid of the device; and determining the level of liquid in the device based at least partly on a time of flight analysis related to the ultrasonic pulse reflected off the liquid surface of the small part of the liquid of the device contained in the gauge.

The method may also be configured to include steps based at least partly on the one or more of the features set forth above.

Computer Program Product

The present invention may also, e.g., take the form of a computer program product having a computer readable medium with a computer executable code embedded therein for implementing the method when run on a signaling processing device that forms part of such a control unit or module. By way of example, the computer program product may, e.g., take the form of a CD, a floppy disk, a memory stick, a memory card, as well as other types or kind of memory devices that may store such a computer executable code on such a computer readable medium either now known or later developed in the future.

Means-Plus-Function Apparatus

According to some embodiments, the present invention may take the form of apparatus that comprise means for implementing or performing the functionality set forth herein either now known or later developed in the future (e.g., technology developed after the filing date of this patent application), including, by way of example, means for reflecting an ultrasonic pulse off a liquid surface of a small part of liquid of a device, including a boiler or hot water tank, contained in a gauge configured on the outside of the device, the device configured to contain most of the liquid, and the gauge configured to receive and contain the small part of the liquid of the device; and means for determining the level of liquid in the device based at least partly the ultrasonic pulse reflected off the liquid surface of the small part of the liquid of the device contained in the gauge, including based at least partly on a time of flight analysis related to the ultrasonic pulse reflected off the liquid surface of the small part of the liquid of the device contained in the gauge.

BRIEF DESCRIPTION OF THE DRAWING

The drawing includes the following Figures, not drawn to scale:

FIG. 1a shows a block diagram of apparatus according to some embodiments of the present invention.

FIG. 1b shows an example of the apparatus shown in FIG. 1a in the form of an ultrasonic water level and control system for a boiler or hot water tank according to some embodiments of the present invention.

FIG. 1c shows a block diagram of a method according to some embodiments of the present invention.

FIG. 2 includes FIGS. 2a and 2b, which show diagrams of an example of an ultrasonic sensor measurement setup according to some embodiments of the present invention, where FIG. 2a shows one view of the ultrasonic sensor measurement setup, and FIG. 2b shows another view of the ultrasonic sensor measurement setup (rotated about 90 degrees relative to the view in FIG. 2a).

FIG. 3 shows a diagram of an example of a design for ultrasonic sensor and adaptor according to some embodiments of the present invention.

FIG. 4a shows an example of the apparatus shown in FIG. 1a in the form of a system hardware layout for an ultrasonic water level gauge and control for a boiler or hot water tank according to some embodiments of the present invention.

FIG. 5 shows an example of a layout for system application software modules for running on the ultrasonic water level gauge and control in FIG. 4b according to some embodiments of the present invention.

FIG. 6 shows an example of the apparatus shown in FIG. 1a in the form of an ultrasonic water level measurement system for a boiler or hot water tank according to some embodiments of the present invention.

FIG. 7a shows a picture of the apparatus shown in FIG. 6 in the form of an ultrasonic water level and control system arranged in relation to a hot water tank according to some embodiments of the present invention.

FIG. 7b shows a picture of the apparatus shown in FIG. 1b in the form of an ultrasonic water level and control system arranged in relation to a boiler according to some embodiments of the present invention.

FIG. 8(1) shows an adapter with a guide according to some embodiments of the present invention, including FIG. 8(1)a showing a perspective view of the adapter with a guide; FIG. 8(1)b showing a front view of the adapter shown in FIG. 8(1)a; and FIG. 8(1)c showing a side view along section lines A-A of the adapter shown in FIG. 8(1)b.

FIG. 8(2) shows an adapter without a guide according to some embodiments of the present invention, including FIG. 8(2)a showing a perspective view of the adapter without a guide; where FIG. 8(2)b showing a front view of the adapter shown in FIG. 8(2)a; and where FIG. 8(2)c showing a side view along section lines A-A of the adapter shown in FIG. 8(2)b.

DETAILED DESCRIPTION OF THE INVENTION

Figure 4B:
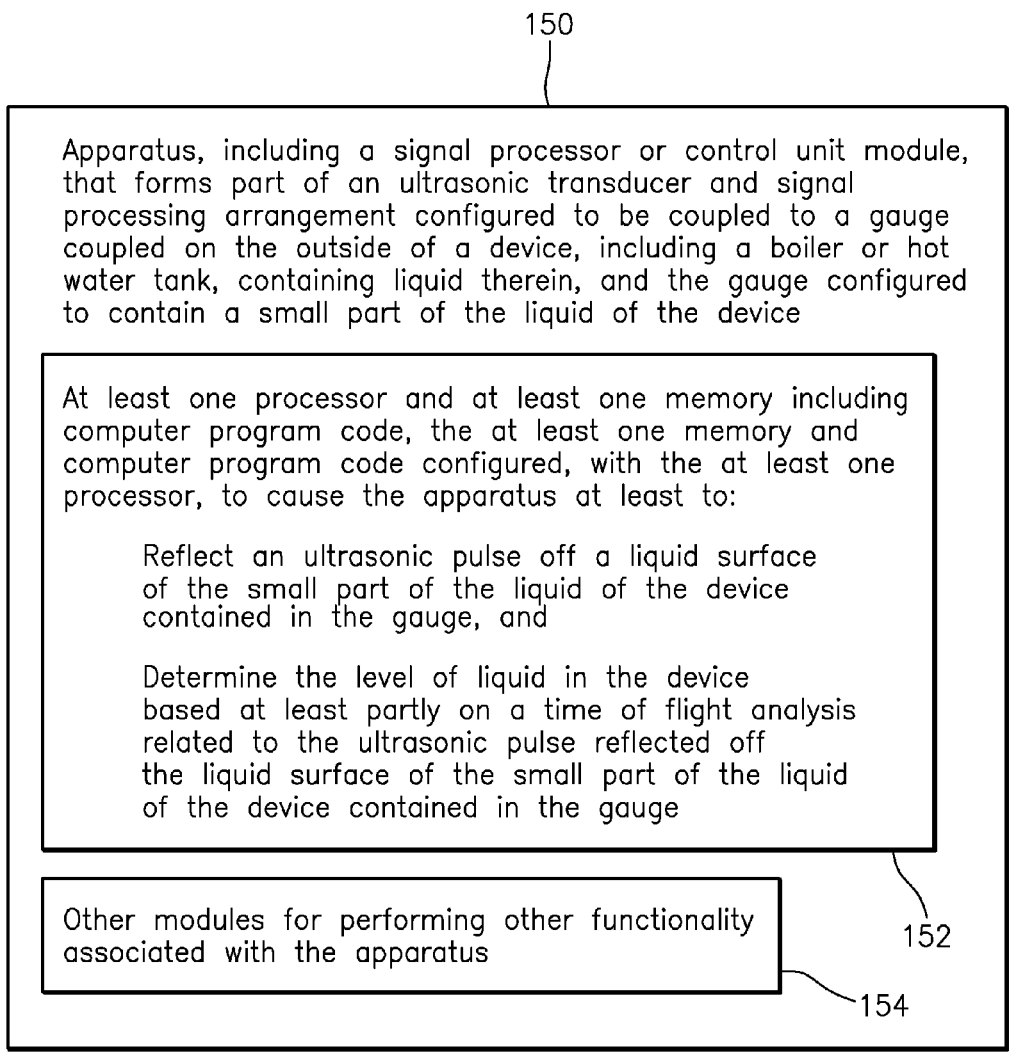
FIG. 4b shows a block diagram of apparatus in the form of a signal processor or control unit module according to some embodiments of the present invention.

FIGS. 1a and 1b: Apparatus, e.g. an Ultrasonic Liquid Level Gauge and Control System FIGS. 1a and 1b show, by way of example, the present invention in the form of apparatus generally indicated as 10, including an ultrasonic liquid level gauge and control system, according to some embodiments of the present invention. The apparatus 10 may comprise a gauge 12 and an ultrasonic transducing and signal processing arrangement 14. The gauge 12 may be configured to be coupled on the outside of a device 20a, 20b, such as a boiler 20a (see FIG. 1b) or a hot water tank 20b (see FIG. 6), having liquid generally indicated as 18a (e.g., water) contained therein. The gauge 12 may also configured to receive and contain a small part 18b of the liquid 18a of the device 20a, 20b. The ultrasonic transducing and signal processing arrangement 14 may be configured to reflect an ultrasonic pulse off a liquid surface 18b' of the small part 18b of the liquid 18a of the device 20a, 20b contained in the gauge 12, and determine the level of the liquid 18 in the device 20a, 20b based at least partly the ultrasonic pulse reflected off the liquid surface 18b' of the small part 18b of the liquid 18a of the device 20a, 20b contained in the gauge 12, including using a technique based at least partly on a time of flight analysis related to the ultrasonic pulse reflected off the liquid surface 18b' of the small part 18b of the liquid 18 of the device 20a, 20b contained in the gauge 12. In FIG. 1b, the ultrasonic pulse and the ultrasonic pulse reflected off the liquid surface 18b' of the small part 18b of the liquid 18a of the device 20a, 20b contained in the gauge 12 are shown and labeled as a water path signal S, as indicated by the two-sided arrow A.

In FIG. 1b, the ultrasonic transducing and signal processing arrangement 14 is shown in the form of a combination of an ultrasonic sensor and adapter labeled 15 and an ultrasonic level gauge and control unit 17. The ultrasonic sensor and adapter 15 is shown and described below in relation to FIG. 3, and the ultrasonic level gauge and control unit 17 is shown and described below in relation to, e.g., FIGS. 4a, 4b and 5.

In FIG. 1a, the apparatus 10 may also include other modules, components, or parts generally indicated as 16 for implementing other functionality associated with the operation of apparatus 10, which do not form part of the underlying invention, and are not described in detail herein.

The Gauge 12

FIGS. 1b and 2 show by way of example the gauge 12 according to some embodiments of the present invention. The gauge 12 may be configured with valve arrangements generally indicated as elements 30a, 30b having a combination of a sight glass 32 and a side washer buffer 33 (see FIG. 3), such that the liquid surface 18b' of the small part 18b of the liquid 18 of the device 20a, 20b contained in the gauge 12 is substantially less turbulent than the liquid 18a in the device 20a, 20b. The gauge 12 may be configured with upper and lower ports or adapters 34a, 34b that are coupled at two different levels to the device 20a, 20b to receive the small part 18b of the liquid 18a of the device 20a, 20b contained in the gauge 12. As shown by way of example in FIG. 2, the sight glass 32 is configured between and held in place with a lower hex nut 32a and an upper hex nut 32b that are respectively coupled to a lower valve member 36a and an upper valve member 36b.

The valve arrangement like elements 30a, 30b are known in the art, and may be configured to allow the passage of the liquid 18a from the device 20a, 20b. For example, in FIG. 2 the valve arrangement 30a may be configured with a handle member 40a coupled to the lower valve case member 36a and configured to turn and open or close the valve arrangement 30a, and when turned to the open position, allowing the liquid to pass through the lower port or adapter 34a and flow into the sight glass 32. Similarly, the valve arrangement 30b may be configured with a handle member 40b coupled to the upper valve case member 36b and configured to turn and open or close the valve arrangement 30b, and when turned to the open position allowing air to pass through the upper port or adapter 34b and flow from the sight glass 32 into the device 20a, 20b. The upper and lower ports or adapters 34a, 34b may also be configured with valve couplings 34a' and 34b' shown in the form of threads. The valve arrangement 30a, 30b is also configured with an adapter 15a, where the adapter 15a is configured to couple the ultrasonic sensor 19 to the lower valve member 36a, and where a corresponding valve member 115b is configured to coupled to the upper valve member 36b. Examples of the adapters 15a with and without a guide are shown and described in relation to FIGS. 8(1) and 8(2).

The valve arrangement 30a, 30b also may be configured with a strengthening arrangement generally indicated as 60 to provide strength, stability and support to the sight glass 32. In FIG. 2, the strengthening arrangement 60 is configured with a bottom member 60a, a top member 60b and intermediate rod-like members 60c', 60c" coupled between the bottom and top members 60a, 60b. The bottom member 60a is configured between the lower valve case member 36a and the lower hex nut 32a, and the top member 60b is configured between the upper valve case member 36b and the upper hex nut 32b. The configuration of the strengthening arrangement 60 is shown by way of example, and the scope of the invention is intended to include other types or kinds of strengthening technique to strengthen, support and stabilize the sight glass 32, either now known or later developed in the future.

FIG. 3: The Adapter and Ultrasonic Sensor Arrangement

FIG. 3 shows one example of an arrangement of the adapter 15a and the ultrasonic sensor 19 in relation to other parts or components of the gauge 12 according to some embodiment of the present invention. The adapter 15a and ultrasonic sensor 19 arrangement is configured to couple to the valve case member 36a (see also FIG. 2) of the gauge 12.

In operation, the ultrasonic sensor 19 may be configured to receive an excitation pulse, convert the excitation pulse to the ultrasonic pulse, and provide the ultrasonic pulse through the small part 18b of the liquid 18a of the device 20a, 20b contained in the gauge 12. The ultrasonic sensor 19 may also be configured to receive a reflected ultrasonic pulse back from the liquid surface 18b' of the small part 18b of the liquid 18 of the device 20a, 20b in the gauge 12, convert the reflected ultrasonic pulse back into a sensor signal containing information about the liquid surface 18b' of the small part 18b of the liquid 18a of the device 20a. 20b contained in the gauge 12, and provide the sensor signal. The adapter 15a may be configured to couple the ultrasonic sensor 19 to the valve case member 36a (see also FIG. 2) of the gauge 12.

Ultrasonic sensors like element 19 are known in the art and the scope of the invention is not intended to be limited to any particular type or kind either now known or later developed in the future.

FIG. 3 shows by way of example one technique to couple the ultrasonic sensor 19 to the valve case member 36a (see also FIG. 2) of the gauge 12 using the adapter 15a which would be appreciated by a person skilled in the art. Moreover, a person skilled in the art would also appreciate and understand how to configure the adapter 15a so as to couple the ultrasonic sensor 19 to the valve case member 36a (see also FIG. 2) of the gauge 12 using other techniques either now known or later developed in the future without undue experimentation.

In FIG. 3, the valve arrangement 30a (FIG. 2) may also be configured to include a lower sight glass washer 35 to support and stabilize the sight glass 32 in relation to the lower valve case member 36a. The valve arrangement 30b may also be configured to include a similar upper sight glass washer (not shown) to support and stabilize the sight glass 32 in relation to the upper valve case member 36b. As shown, a side washer and buffer arrangement generally indicated as 33 is configured below the sight glass washer 35, where the washer 35a is configured with orifices 35a" to allow the passage of liquid between the sight glass 32 and the buffer 33a.

FIG. 4a: Ultrasonic Transducing and Signal Processing Arrangement 14

FIG. 4a shows by way of example the ultrasonic transducing and signal processing arrangement 14 according to some embodiments of the present invention, which may be configured with a pulser/receiver module 70, a digital signal processor (DSP) or microprocessor control unit (MCU) 80 and a switches module 100.

Pulser/Receiver Module 70

In FIG. 4b, the pulser/receiver module 70 is configured to be coupled between the ultrasonic sensor 19 in FIG. 3 and the DSP/MCU 80 and includes a transit pulse generator 72, a T/R network 74, an HP filter 76, e.g. having a 10 KHz cutoff and an op amp 78.

The pulser/receive module 70 is also configured to receive a sync signal along signal path 70a from the DSP/MCU 80 and provide the excitation pulse along signal path 70b to the ultrasonic sensor 19 in FIG. 3. The pulser/receive module 70 is also configured to receive the sensor signal provided from the ultrasonic sensor 19 in FIG. 3 along signal path 70b containing information about the liquid surface 18b' (FIG. 1b) of the small part 18b of the liquid 18a of the device 20a, 20b contained in the gauge 12, and provide a filtered and amplified sensor signal along signal path 70c containing information about the liquid surface 18b' (FIG. 1b) of the small part 18b of the liquid 18a of the device 20a, 20b contained in the gauge 12. Pulser/receiver modules are generally known in the art, including pulser modules having such a transit pulse generator, such a T/R network, such an HP filter with a 10 KHz cutoff and such an op amp, and the scope of the invention is not intended to be limited to any particular type or kind thereof either now known or later developed in the future. By way of example, the one such known pulser/receiver modules may take the form of a pulser/receiver 5007PR, which may be configured to generate an electrical pulse which is transmitted to an ultrasonic transducer.

The DSP/MCU Module 80

In FIG. 4a, the DSP/MCU module 80 is configured between the pulser/receive module 70 and the switches module 100 and includes op amps 81a, 81b, 81c; low pass (LP) filters 82a, 82b, 82c having, e.g., 1 MHz cutoffs; analog to digital converters (ADC) 83a having, e.g., a sampling rate (SR)>2 MHz, and analog to digital converters (ADC) 83b, 83c having, e.g., a SR>2 kHz; at least one processor in the form of a DSP/MCU 84; an LCD 85; a keypad 86; at least one memory device, such as a RAM 87 and an EEPROM 88; CAN 89; an RS232 interface 90; an Ethernet interface 91; and a digital to analog converter 92. By way of example, the DSP/MCU 84 may take the form of a TMS320F2810 chip that is known in the art.

For example, the DSP/MCU module 80 may be configured to receive the filtered and amplified sensor signal along the signal path 70c, convert the filtered and amplified sensor signal, determine the liquid level 18b' of the liquid 18b of the device 20a, 20b contained in the gauge 12 based at least partly on the digital filtered and amplified sensor signal received; and provide at least one signal processing and control signal containing information about the liquid surface 18b' of the small part 18b of the liquid 18a of the device 20a, 20b contained in the gauge 12. The DSP/MCU module 80 may also be configured to provide the at least one signal processing and control signal to the switches module 100 for controlling high and low water level switching conditions, and well as providing some control signal to the DAC 92, which may be converted to a corresponding analog processing and control signal along signal path 92a. The DSP/MCU module 80 may also be configured to provide the sync signal along signal path 70c that causes the excitation pulse to be provided from the pulser/receiver module 70 to the ultrasonic sensor 19. In operation, the at least one memory device, in the form of the RAM 87 and/or EEPROM 88, may also be configured with computer program code contained therein to cause the at least one processor in the form of the DSP/MCU 84 to implement the functionality to perform of the present invention.

According to some embodiments of the present invention, the DSP/MCU module 80 may be configured to determine the level of the liquid in the device 20a, 20b based at least partly on the flight time of the ultrasonic pulse reflected, and the fact that the liquid level of the device contained in the gauge 12 is about the average liquid level in the device for the close loop hydraulic system. However, the scope of the invention is not intended to be limited to using only a time of flight analysis technique; and embodiments are envisioned using other types or kind of techniques either now known or later developed in the future and implemented by a person skilled in the art based at least partly on the disclosure herein without undue experimentation.

According to some embodiments of the present invention, the DSP/MCU module 80 may be configured to receive a temperature sensor signal along signal path 81U and a pressure sensor signal along signal path 81c'.

The Switches Modules 100

By way of example, the level switch module 100 may be configured with a high water level switching circuit 102 and a low water level switching circuit 104. In operation, the level switch module 100 may be configured to respond to the at least one signal processing control signal along the signal paths 80a, 80b and provide at least one level switch control signal along signal paths 100a, 100b containing information about a high or low water level switching control of the device 20a, 20b based on the at least one signal processing control signal received.

FIG. 4b: Apparatus, e.g. a Signal Processor or Control Unit Module 150

FIG. 4b shows by way of example apparatus generally indicated as 150 according to some embodiments of the present invention in the form of a signal processor or control unit module that forms part the ultrasonic transducer and signal processing arrangement 14 shown in FIG. 1a. In effect, the scope of the invention is intended to include a module, device, component or chipset configured to perform the signal processing or control unit functionality for implementing the underlying invention, including implementing at least some part of the functionality described in relation to the DSP/MCU module 80 in FIG. 4a alone or together with the system application software modules shown and described in relation to FIG. 5 below.

In FIG. 4b, the signal processor or control unit module 150 may be configured with at least one processor and at least one memory generally indicated as 152, including computer program code, as well as other modules 154 for performing other functionality associated with the apparatus, including data and address buses, input/output modules, etc. The at least one processor may take the form of the DSP/MCU element 84 in FIG. 4a, and the at least one memory may take the form of the RAM 87 and/or the EEPROM 88 in FIG. 4a. Consistent with that set forth herein, the signal processor or control unit module 150 may be configured to be coupled to a gauge like element 12 in FIG. 1b that is coupled on the outside of a device, like devices like the boiler 20a (FIG. 1b) or the hot water tank 20b (FIG. 6), containing liquid therein, and where the gauge like element 12 is configured to contain a small part 18b of the liquid 18a of the device 20a, 20b. By way of example, the signal processor or control unit module 150 may be coupled to the gauge 12 in FIG. 1b via some combination of components disclosed herein, including, e.g., the combination of sensor and adapter 15 in FIG. 1b.

In operation, the at least one memory like RAM/EEPROM 87, 88 and the computer program code may be configured, with the at least one processor like DSP/MCU 84, to cause the apparatus 150 at least to: reflect the ultrasonic pulse off the liquid surface like surface 18U of the small part 18b of the liquid 18a of the device 20a, 20b contained in the gauge 12, and determine the level of liquid 18a in the device 20a, 20b based at least partly a time of flight analysis related to the ultrasonic pulse reflected off the liquid surface 18b' of the small part 18b of the liquid 18 of the device 20a, 20b contained in the gauge 12.

The scope of the invention is also intended to include the processor and control unit 150 being configured to include at least some other parts or components of the DSP/MCU module 80 shown in FIG. 4a, as well as one or more of the other features set forth herein.

FIG. 5: System Application Software Modules

The DSP/MCU module 80, including the at least one memory 87, 88 and computer program code may be configured, with the at least one DSP/MCU processor 84, to cause the DSP/MCU module 80 at least to perform a time of flight analysis (TOF) in the frequency domain, including using a data preprocessing module 110 and a TOF module 112. The data preprocessing module 110 may be configured with a history buffer module 110a, an averaging module 110b and a filter module 110c, as shown. In operation, the data preprocessing module 110 receives data, and processes the same with these modules 110a, 110b and 110c, and provides a preprocessed data to the TOF module 112. The TOF module 112 may be configured with at least one of a window module 112a, a Fast Fourier Transform module 112b, a cross-correlation module 112c and an inverse discrete Fourier Transform 112d and a TOF module 112e in order to determine the time of flight of the ultrasonic pulse reflected off the liquid surface 18b'. The time of flight information may be provided from the TOF module 112e to a level display module 114 configured with a level converter module 114a and a display data module 114b. The level converter module 114a is configured to convert the time of flight information into information that can be displayed, and to provide this converted information to the display data module for displaying. This converted information is also provided to a level control module 116 that is configured to process this converted information and provide level switch signals as control signals, consistent with that described in relation to switches modules 100 shown in FIG. 4a.

FIG. 6: Ultrasonic Water Level Measurement for Hot Water Heater

FIG. 6 shows apparatus generally indicated as 200 according to some embodiments of the present invention in the form of an ultrasonic water level measurement for hot water heater.

The measurement guiding pipe 12, the hot water tank 20b, etc. are labeled consistent with that described in relation to FIG. 1b and not repeated here. The ultrasonic transducer and signal processing arrangement 14 in FIG. 1a is configured in FIG. 6 to include the sensor 15 (see also FIG. 1b), the pulser/receiver 70 (see also FIG. 4a), an A/D converter 202 in the form of at least some part of an oscilloscope (e.g. a Tektronic 320 device) and a computing or computer device 204. As shown, the A/D converter 202 may be coupled to the computing or computer device 204 via an RS232 connection. The computing or computer device 204 may be configured to perform the signal processing or control unit functionality for implementing the underlying invention, including cross-correlation algorithms for the "time of flight," as well as implementing at least some part of the functionality described in relation to the DSP/MCU module 80 in FIG. 4a alone or together with the system application software modules shown and described in relation to FIG. 5, consistent with that set forth herein.

FIG. 1c: The Method

According to some embodiments, the present invention may take the form of a method comprising one or more steps for: reflecting an ultrasonic pulse off a liquid surface like 18b' of a small part 18b of liquid 18a of a device, including a boiler 20a (FIG. 1b) or hot water tank 20b (FIG. 6), contained in a gauge like 12 (FIG. 1b or 6) configured on the outside of the device, the device configured to contain most of the liquid 18a, and the gauge 12 configured to receive and contain the small part 18b of the liquid 18a of the device; and determining the level of liquid 18a in the device based at least partly on a time of flight analysis related to the ultrasonic pulse reflected off the liquid surface 18b' of the small part 18b of the liquid 18a of the device contained in the gauge 12.

The scope of the invention is also intended to include the method being implemented together with one or more of the features set forth herein.

The Signal Processing Modules

By way of example, the functionality of the signal processing modules set forth herein, including the signal processing modules described in relation to FIGS. 1a, 1b, 4a, 4b, 5, 6, 7a and 7b, may be implemented using hardware, software, firmware, or a combination thereof. In a typical software implementation, the modules would include one or more microprocessor-based architectures having, e.g., at least one processor or microprocessor like element 84 in FIG. 4a, random access memory (RAM) and/or read only memory (ROM) like elements 87, 88, input/output devices like elements 90, 91 and control, data and address buses connecting the same as shown. A person skilled in the art would be able to program such a microcontroller (or microprocessor)-based implementation to perform the functionality described herein without undue experimentation. The scope of the invention is not intended to be limited to any particular implementation using technology either now known or later developed in the future. The scope of the invention is intended to include implementing the functionality of one or more processors as a stand-alone processor or processor module, as separate processor or processor modules, as well as some combination thereof.

FIGS. 8(1) and 8(2)

FIG. 8(1) shows an example of the adapter 15a having an adapter member 15a' with a guide 15" according to some embodiments of the present invention. In FIG. 8(1), the guide 15" is configured to focus the ultrasonic signaling into the sight glass like element 32 in FIG. 2. In FIG. 8(1), the guide 15a" may also be configured without an orifice 15a'''.

FIG. 8(2) shows another example in the form of the adapter 15b having an adapter member 15b' and configured without a guide according to some embodiments of the present invention.

The scope of the invention is intended to include embodiments of the adapter 15a using a guide and embodiments of the adapter 15b not using a guide.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the present invention is described by way of example in relation to a boiler or hot water tank, the scope of the invention is intended to include using the same in relation to other types or kinds of liquid processing devices either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. Apparatus, including an ultrasonic liquid level gauge and control system, comprising:
   a gauge configured to be coupled on the outside of a device, including a boiler, having liquid contained therein subject to turbulence, and the gauge also configured with ports or adapters that are coupled at two different levels to the device to receive and contain part of the liquid of the device in the gauge and having a liquid surface subject to less turbulence that the liquid contained in the device; and
   an ultrasonic transducing and signal processing arrangement configured to:
      reflect an ultrasonic pulse off a liquid surface of the part of the liquid of the device contained in the gauge, and determine the level of liquid in the device based at least partly on a time of flight analysis related to the ultrasonic pulse reflected off the liquid surface of the part of the liquid of the device contained in the gauge.

2. Apparatus according to claim 1, wherein the gauge is configured with a valve arrangement having a sight glass configured to receive and contain the part of the liquid of the device.

3. Apparatus according to claim 1, wherein the ultrasonic transducing and signal processing arrangement comprises a digital signal processor (DSP) or microprocessor control unit (MCU) configured to determine the level of the liquid in the device based at least partly on the flight time of the ultrasonic pulse reflected, and the fact that the liquid level of the device contained in the gauge is about an average liquid level in the device for a close loop hydraulic system.

4. Apparatus according to claim 1, wherein the ultrasonic transducing and signal processing arrangement comprises an ultrasonic sensor and adaptor configured in relation to the gauge to:
   receive an excitation pulse, convert the excitation pulse to the ultrasonic pulse, and provide the ultrasonic pulse through the part of the liquid of the device contained in the gauge; or
   receive a reflected ultrasonic pulse back from the liquid surface of the part of the liquid of the device in the gauge, convert the reflected ultrasonic pulse back into a sensor signal containing information about the liquid surface of the part of the liquid of the device contained in the gauge, and provide the sensor signal; or
   the combination thereof.

5. Apparatus according to claim 1, wherein the ultrasonic transducing and signal processing arrangement comprises a level switch module configured to control the device based at least partly on the determination related to the level of liquid in the device.

6. Apparatus according to claim 4, wherein the ultrasonic transducing and signal processing arrangement comprises a pulser/receive module configured to:
   receive a sync signal and provide the excitation pulse; or
   receive the sensor signal containing information about the liquid surface of the small part of the liquid of the device contained in the gauge, and provide a filtered and amplified sensor signal containing information about the liquid surface of the small part of the liquid of the device contained in the gauge; or
   the combination thereof.

7. Apparatus according to claim 6, wherein the ultrasonic transducing and signal processing arrangement comprises a digital signal processor (DSP) and microprocessor control unit (MCU) module having at least one processor and at least one memory including computer program code, the at least one memory and computer program code configured, with the at least one processor, to cause the digital signal processor (DSP) and microprocessor control unit (MCU) module at least to:
   receive the filtered and amplified sensor signal, convert the filtered and amplified sensor signal, and provide a digital filtered and amplified sensor signal containing information about the liquid surface of the small part of the liquid of the device contained in the gauge.

8. Apparatus according to claim 7, wherein the at least one memory and computer program code configured, with the at least one processor, to cause the digital signal processor (DSP) and microprocessor control unit (MCU) module at least to:
   provide the sync signal; or
   receive the digital filtered and amplified sensor signal containing information about the liquid surface of the small part of the liquid of the device contained in the gauge, and determine the liquid level of water in the device based at least partly on the digital filtered and amplified sensor signal received;
   the combination thereof.

9. Apparatus according to claim 8, wherein the at least one memory and computer program code configured, with the at least one processor, to cause the digital signal processor (DSP) and microprocessor control unit (MCU) module at least to determine the liquid level of water in the device based at least partly on the flight time of the ultrasonic signal reflected, and the fact that the liquid level of the small part of the liquid of the device contained in the gauge is about an average liquid level in the device for a close loop hydraulic system.

10. Apparatus according to claim 9, wherein the at least one memory and computer program code configured, with the at least one processor, to cause the digital signal processor (DSP) and microprocessor control unit (MCU) module at least to perform a flight time analysis in the frequency domain, including using at least one of a Fast Fourier Transform, a cross-correlation and an inverse discrete Fourier Transform in order to determine the time of flight.

11. Apparatus according to claim 9, wherein the at least one memory and computer program code is configured, with the at least one processor, to cause the digital signal processor (DSP) and microprocessor control unit (MCU) module at least to provide at least one control signal containing information about a high or low level switching condition based at least partly on the determination related to the liquid level of water in the device.

12. Apparatus according to claim 11, wherein the ultrasonic transducing and signal processing arrangement comprises a level switch module configured to:

respond to the at least one control signal and provide at least one level switch control signal containing information about a high or low water level switching control of the device based on the at least one control signal received.

13. Apparatus, including an ultrasonic liquid level gauge and control system, comprising:
   a boiler device having liquid contained therein subject to turbulence from heating the liquid contained therein;
   a gauge configured to be coupled on the outside of the boiler device, and the gauge also configured with ports or adapters that are coupled at two different levels to the boiler device to receive and contain part of the liquid of the device in the gauge and having a liquid surface subject to less turbulence than the liquid contained in the boiler device; and
   an ultrasonic transducing and signal processing arrangement configured to:
      reflect an ultrasonic pulse off a liquid surface of the part of the liquid of the boiler device contained in the gauge, and
      determine the level of liquid in the device based at least partly on a time of flight analysis related to the ultrasonic pulse reflected off the liquid surface of the part of the liquid of the device contained in the gauge.

14. Apparatus according to claim 13, wherein the gauge is configured with a valve arrangement having a sight glass configured to receive and contain the part of the liquid of the device.

15. Apparatus according to claim 13, wherein the ultrasonic transducing and signal processing arrangement comprises an ultrasonic sensor and adaptor configured in relation to the gauge to:
   receive an excitation pulse, convert the excitation pulse to the ultrasonic pulse, and provide the ultrasonic pulse through the part of the liquid of the boiler device contained in the gauge; or
   receive a reflected ultrasonic pulse back from the liquid surface of the part of the liquid of the device in the gauge, convert the reflected ultrasonic pulse back into a sensor signal containing information about the liquid surface of the part of the liquid of the boiler device contained in the gauge, and provide the sensor signal; or
   the combination thereof.

* * * * *